I. J. Ryerson.
Gate Hinge.
Nº 91,167.        Patented Jun. 8, 1869.
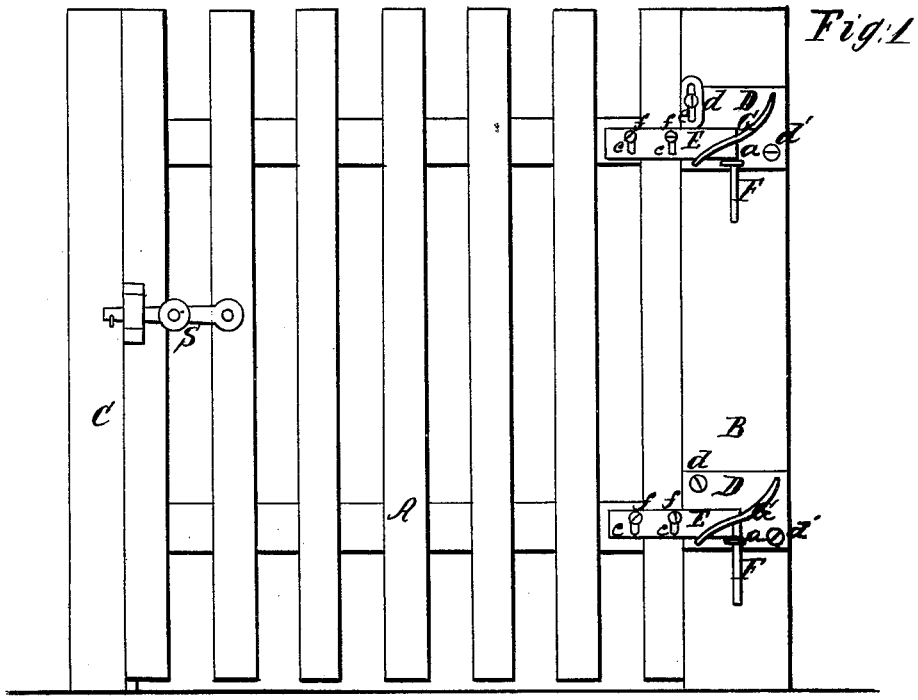
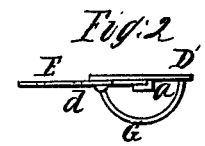
Witnesses
Wm Sherburn
John Getty
Inventor
Ira J. Ryerson
By his Attorney
G. A. Chapin

United States Patent Office.

IRA J. RYERSON, OF PIERCETON, INDIANA.

Letters Patent No. 91,167, dated June 8, 1869.

IMPROVEMENT IN GATE-HINGE.

The Schedule referred to in these Letters Patent and making part of the same.

*To all whom it may concern:*

Be it known that I, IRA J. RYERSON, of Pierceton, in the county of Kosciusko, in the State of Indiana, have invented an Improved Gate-Hinge; and I do hereby declare that the following is a full and exact description thereof, reference being had to the accompanying drawings, and to the letters of reference marked thereon, making a part of this specification, in which—

Figure 1 is an elevation of a gate, with my improved hinge attached, and in position for use.

Figure 2, a top view of the hinge, detached from the gate.

This invention relates to an improvement in that class of hinges which is designed for hanging self-shutting gates; and Its nature consists in the use of an adjustable hinge, which is pivoted to a plate that is rigidly fastened to the gate-post, and supports a semi-helical guide, on which the adjustable hinge is made to bear, and raise the gate, when it is being swung open.

And, further, in an adjustable stop, which is placed above the hinge, and used to prevent the gate from being raised off from its hinges, when it is shut.

In order to give a correct understanding of my invention, I have marked corresponding parts with similar letters, and will now give a detailed description.

E represents the adjustable wing of the hinge, which is made of metal, or other suitable material, and it has slots, $c\ c$, made through it, as seen at fig. 1, in order that it may be adjusted on the gate A, and receive the screws $f\ f$, which hold the hinge in place on the gate.

The adjustable wing E has also a pivot, F, which projects downward, and through an eye or loop, $a$, that is cast solid to the plate D, or otherwise securely fastened to the same.

This plate D has, rigidly attached to it, a semi-helical guide, G, on which the adjustable wing E is supported, and carried upward, when the gate A is being opened, and moved downward, when the gate is being shut, by its own gravity.

An adjustable metal stop, $d$, fig. 1, is made of metal, and it has a slot, $e$, through it, and is used to prevent the gate A from being raised off from its hinges when it is shut.

The object of the slot $e$ is to permit the stop $d$ to be raised or lowered, as the case may require, when the wing E has its position changed on the gate A.

This arrangement of the stop $d$, I consider important, for when the wing E becomes worn on the guide G, it can be adjusted lower down, and thus prevent swine, or other small stock, from raising the gate so as to lift the latch S out of the catch.

The method of securing the hinge to the gate and gate-post is so simple as to require no special instructions.

When the gate has sagged, or, for any other cause, it has to be raised, the wing E can be adjusted lower down, by simply loosening the screws $f\ f$; and after the hinge has been properly set, they should be tightened; and, when the wing E becomes worn at the under edge, by friction on the guide G, the stop $d$ can be set down closely on the wing, by simply loosening the screw in the slot E.

It will be seen, from this description, that the device above set forth and shown is both cheap and substantial, and that suitable provision is made for adjusting it to the gate.

Having thus fully described my invention,

What I claim, and desire to secure by Letters Patent of the United States, is—

The adjustable wing E, pivoted to the plate D, and made to turn on the guide G, in combination with the adjustable stop $d$, substantially as specified and shown.

IRA J. RYERSON.

Witnesses:
WM. SHERBURN,
JOHN GETTY.